(12) United States Patent
Chou et al.

(10) Patent No.: US 12,457,634 B2
(45) Date of Patent: Oct. 28, 2025

(54) COMMUNICATION SYSTEM AND COMMUNICATION METHOD

(71) Applicant: Realtek Semiconductor Corporation, Hsinchu (TW)

(72) Inventors: Hsin-I Chou, Hsinchu (TW); Yung-Ching Hsieh, Hsinchu (TW); Jian-Jun Zhou, Jiangsu Province (CN)

(73) Assignee: Realtek Semiconductor Corporation, Hsinchu (TW)

( * ) Notice: Subject to any disclaimer, the term of this patent is extended or adjusted under 35 U.S.C. 154(b) by 385 days.

(21) Appl. No.: 18/147,712

(22) Filed: Dec. 29, 2022

(65) Prior Publication Data

US 2023/0254890 A1 Aug. 10, 2023

(30) Foreign Application Priority Data

Feb. 10, 2022 (CN) .......................... 202210125361.3

(51) Int. Cl.
*H04W 72/566* (2023.01)
*H04L 5/00* (2006.01)
*H04W 84/12* (2009.01)

(52) U.S. Cl.
CPC ......... *H04W 72/569* (2023.01); *H04L 5/0091* (2013.01); *H04W 84/12* (2013.01)

(58) Field of Classification Search
CPC ............... H04W 72/569; H04W 84/12; H04W 72/1215; H04L 5/0091; H04L 5/0064; H04L 5/0023; H04B 1/40; H04B 1/401; H04B 5/48
See application file for complete search history.

(56) References Cited

U.S. PATENT DOCUMENTS

| | | | | |
|---|---|---|---|---|
| 2009/0137206 A1* | 5/2009 | Sherman | ............... | H04W 16/14 455/41.2 |
| 2012/0289158 A1* | 11/2012 | Palin | ..................... | H04W 8/005 455/41.2 |

* cited by examiner

*Primary Examiner* — Yaotang Wang
(74) *Attorney, Agent, or Firm* — CKC & Partners Co., LLC

(57) ABSTRACT

A communication system includes an antenna, a first wireless communication circuit, a second wireless communication circuit, a switching circuit, and a control circuit. During a second mode, a transmission and reception period of the antenna is divided by the control circuit into a plurality of first scheduling periods and a plurality of second scheduling periods interleaved with the first scheduling periods. The control circuit controls the switching circuit to select the first path or the second path to connect the antenna to the first wireless communication circuit or the second wireless communication circuit, according to a second priority sequence and a third priority sequence during the first scheduling periods and the second scheduling periods, respectively. The second priority sequence is different from the third priority sequence.

8 Claims, 7 Drawing Sheets

COMMUNICATION SYSTEM AND COMMUNICATION METHOD

CROSS-REFERENCE TO RELATED APPLICATION

This application claims priority to China Application Serial Number 202210125361.3, filed Feb. 10, 2022, which is herein incorporated by reference in its entirety.

BACKGROUND

Field of Invention

The present invention relates to a communication system. More particularly, the present invention relates to a communication system and communication method.

Description of Related Art

In nowadays techniques, BLUETOOTH™ and wireless local area network techniques are usually implemented in the same device. Therefore, how to avoid the signal transmission interference in the same device and allocate enough operation time for BLUETOOTH™ and wireless local area network is an important issue in this field.

SUMMARY

To achieve the aforesaid purpose, one aspect of the present disclosure is related to a communication system. The communication system comprises an antenna, a first wireless communication circuit, a second wireless communication circuit, a switch circuit and a control circuit. The first wireless communication circuit is configured to transmit or receive a plurality of first packets through a first path. The second wireless communication circuit is configured to transmit or receive a plurality of second packets through a second path. The switch circuit is configured to select the first path and or second path to connect the antenna to the first wireless communication circuit or the second wireless communication circuit. The control circuit is configured to control the switch circuit to select the first path or the second path according to a first priority sequence in a first mode, and divide a transmission and reception period of the antenna into a plurality of first scheduling periods and a plurality of second scheduling periods interleaved with the first scheduling periods in a second mode, and wherein the control circuit controls the switch circuit, according to a second priority sequence during the first scheduling periods and according to a third priority sequence during the second scheduling periods, to select the first path or the second path in the second mode, wherein the second priority sequence is different from the third priority sequence.

The other aspect of the present disclosure is related to a communication method for operating a communication system. The communication system comprises an antenna, a first wireless communication circuit and a second wireless communication circuit. The antenna respectively connects the first wireless communication circuit and a second wireless communication circuit through a first path and a second path. The communication method comprises the following steps. The communication system is determined to operate in a first mode or a second mode according to an operation state of the second wireless communication circuit. In a first mode, a switch circuit is controlled to select the first path or the second path according to a first priority sequence. In a second mode, a transmission and reception period of the antenna is divided into a plurality of first scheduling periods and a plurality of second scheduling periods interleaved with the first scheduling periods, and the switch circuit is controlled to select the first path or the second path, according to a second priority sequence during the first scheduling periods and according to a third priority sequence during the second scheduling periods, to connect the antenna to the first wireless communication circuit or the second wireless communication circuit, wherein the second priority sequence is different from the third priority sequence.

Summary, the communication system of the present disclosure determines the permission to utilize the single antenna for the first communication circuit and the second communication circuit, such that the first communication circuit and the second communication circuit can share the antenna and can complete their jobs in the appropriate timing.

BRIEF DESCRIPTION OF THE DRAWINGS

The present invention can be more fully understood by reading the following detailed description of the embodiment, with reference made to the accompanying drawings as follows.

DETAILED DESCRIPTION

Figure 1:
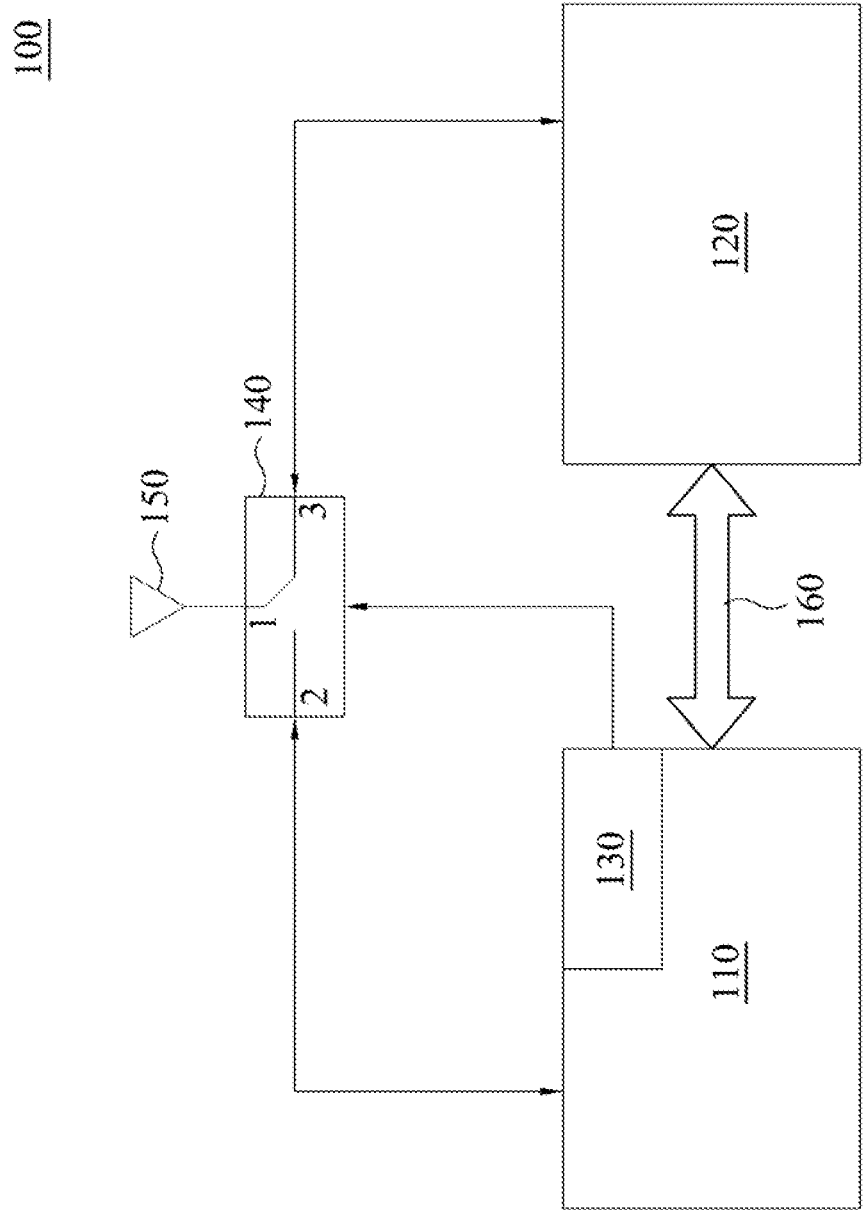
FIG. 1 is a schematic diagram of a communication system in accordance with one embodiment of the present disclosure.

Reference is made to FIG. 1. FIG. 1 is a schematic diagram of a communication system 100 in accordance with one embodiment of the present disclosure. As shown in FIG. 1, the communication system 100 includes a first communication circuit 110, a second communication circuit 120, a control circuit 130, a switch circuit 140, an antenna 150 and a coexistence interface 160. The first communication circuit 110 is configured to transmit or receive first packets. The second communication circuit 120 is configured to transmit or receive second packets.

In some embodiments, the first communication circuit 110 can be implemented by wireless local area network communication circuit, such as WiFi communication circuit or WiFi communication module. The second communication circuit 120 can be implemented by BLUETOOTH™ communication circuit which includes BLUETOOTH™ low energy techniques. Therefore, the first packets can be considered as WiFi communication data, and the second packets can be considered as BLUETOOTH™ communication data.

The coexistence interface 16 is configured to receive packets/signal attribution, priority and operation state. In some embodiments, the coexistence interface 160 can be implemented by 2-wire, 3-wire or 4-wire packet traffic arbitration (PTA).

In structure, the coexistence interface 160 is electrically coupled between the first communication circuit 110 and the second communication circuit 120. The first communication circuit 110 and the second communication circuit 120 are electrically coupled to the switch circuit 140. The switch circuit 140 is electrically coupled to the antenna 150.

To be noted that, since the antenna 150 are utilized by the first communication circuit 110 and the second communication circuit 120, and the permission right for utilizing the antenna 150 is determined by the control circuit 130 according to the information transformed through the coexistence interface 160, the switch circuit 140 is accordingly controlled to conduct the electrical path between the antenna 150 to the first communication circuit 110 or the second communication circuit 120.

Specifically, the antenna 150 is electrically coupled to a node 1 of the switch circuit 140. The first communication circuit 11 is electrically coupled to a node 2 of the switch circuit 140. The second communication circuit 120 is electrically coupled to a node 3 of the switch circuit 140. If the control circuit 130 is determined to permit the first communication circuit 110 for utilizing the antenna 150 to transmit or receive the first packets, the control circuit 130 control the switch circuit 140 selects an electrical path between the node 1 and 2 to connect the first communication circuit 110 to the antenna 150, such that the first communication circuit 110 transmits or receives the first packets through the electrical path between the nodes 1-2.

On the other hand, if the control circuit 130 determines to permit the second communication circuit 120 for utilizing the antenna 150 to transmit or receive the second packets, the control circuit 130 controls the switch circuit 140 select an electrical path between the node 1 and 3 to connect the second communication circuit 120 to the antenna 150, such that the second communication circuit 120 transmits or receives the second packets through the electrical path between the nodes 1-3.

Figure 2:
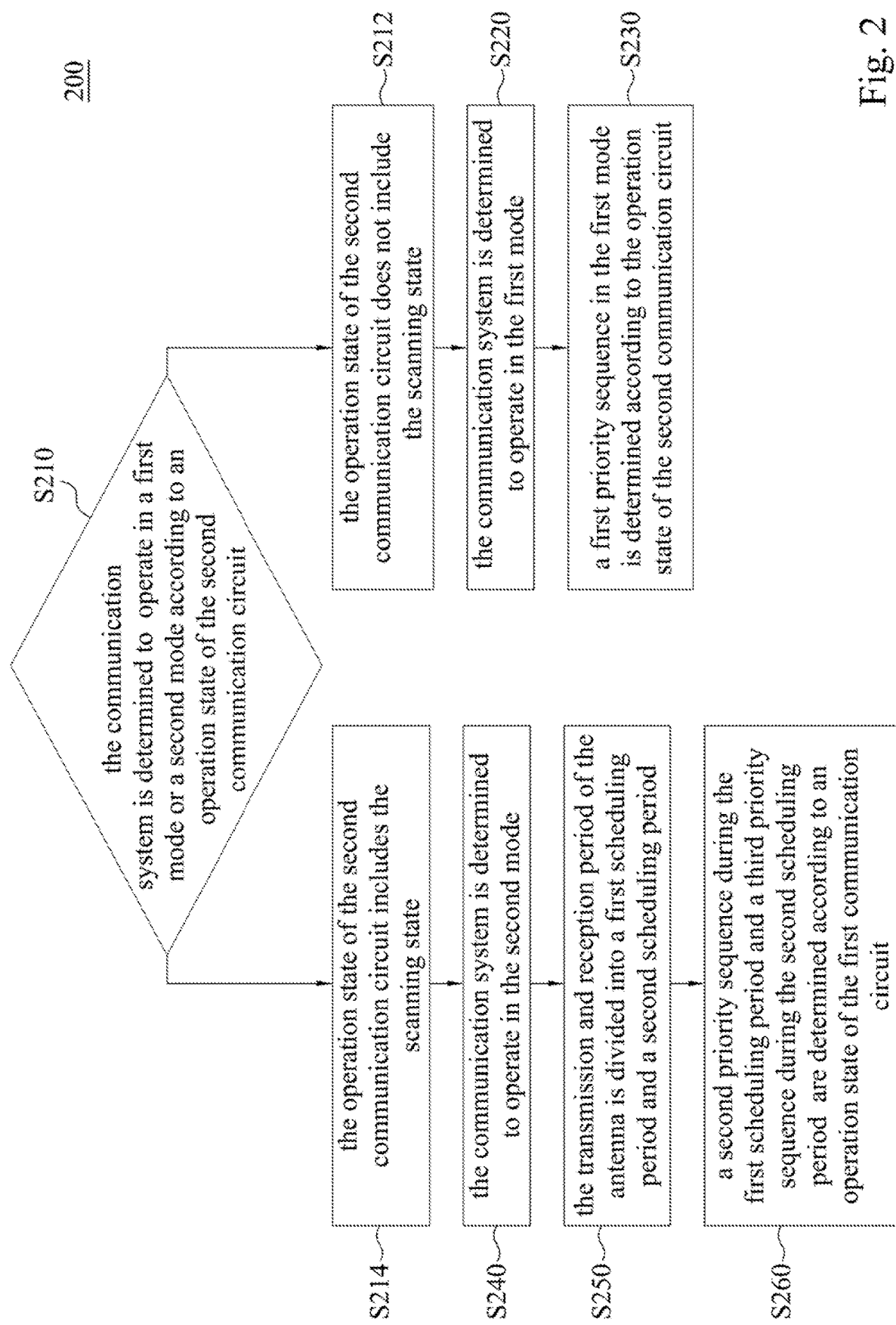
FIG. 2 is a flowchart of a communication method in accordance with one embodiment of the present disclosure.
Figure 3A:
FIG. 3A is a schematic diagram of transmission and reception period of the antenna in FIG. 1 under a first mode in accordance with one embodiment of the present disclosure.
Figure 3B:
FIG. 3B is a schematic diagram of transmission and reception period of the antenna in FIG. 1 under a second mode in accordance with one embodiment of the present disclosure.

Reference is made to FIGS. 2, 3A and 3B. FIG. 2 is a flowchart of a communication method 200 in accordance with one embodiment of the present disclosure. As shown in FIG. 2, the communication method 200 includes steps S210, S212, S214, S220, S230, S240, S250 and S260. Steps S210, S212, S214, S220, S230, S240, S250 and S260 can be operated by the control circuit 130 with the cooperation of the coexistence interface 160. FIG. 3A is a schematic diagram of transmission and reception period 300 of the antenna 150 in FIG. 1 under a first mode in accordance with one embodiment of the present disclosure. FIG. 3B is a schematic diagram of transmission and reception period 300 of the antenna 150 in FIG. 1 under a second mode in accordance with one embodiment of the present disclosure.

In step S210, the communication system 100 is determined to operate in a first mode or a second mode according to an operation state of the second communication circuit. In some embodiments, operation state of the second communication circuit 120 can be an advertising state, a connection state, an initial state or a scanning state.

In step S212, the operation mode of the second communication circuit 120 does not include the scanning state. Since the second communication circuit 120 (such as, BLUETOOTH™ communication circuit) requires short frame length in the advertising state, the connected state and the initial state, and if the control circuit 130 determines the second communication circuit 120 does not includes the scanning state, the transmission and reception period 300 of the antenna 150 may not be divided, and the permission for utilizing the antenna 150 can be directly determined by a first sequence, and the step S220 is followed to operate in the first mode.

The first mode dose not divide the transmission and reception period 300 of the antenna 150, and the permission for utilizing the antenna 150 is directly determined by the first sequence, as shown in FIG. 3A.

In step, S214, the second communication circuit 120 includes the scanning state. Since the scan packets are usually low priority packets, and the scan frame length is relatively longer, if the transmission and reception period 300 does not been divided under the scan state of the second communication circuit 120, the transmission and reception of the communication system 100 is usually occupied by the first communication circuit 110, and the second communication circuit 120 may not has enough time to finish the scan task. Therefore, the present disclosure provide the communication method 200 for dividing the transmission and reception period 300 of the antenna 150 under the scanning state of the second communication circuit 120, and the permission for utilizing the antenna 150 is determined by different priority sequence during different scheduling periods. And step S240 are followed to operate in the second mode.

In the second mode, the transmission and reception period 300 of the antenna 150 is divided into at least two adjacent scheduling periods, and the permission for utilizing the antenna 150 is determined by different priority sequences during the at least two adjacent scheduling periods, as shown in FIG. 3B. In FIG. 3B, the transmission and reception period 300 of the antenna 150 is divided into the first scheduling period 310 and the second scheduling period 320.

Figure 4:
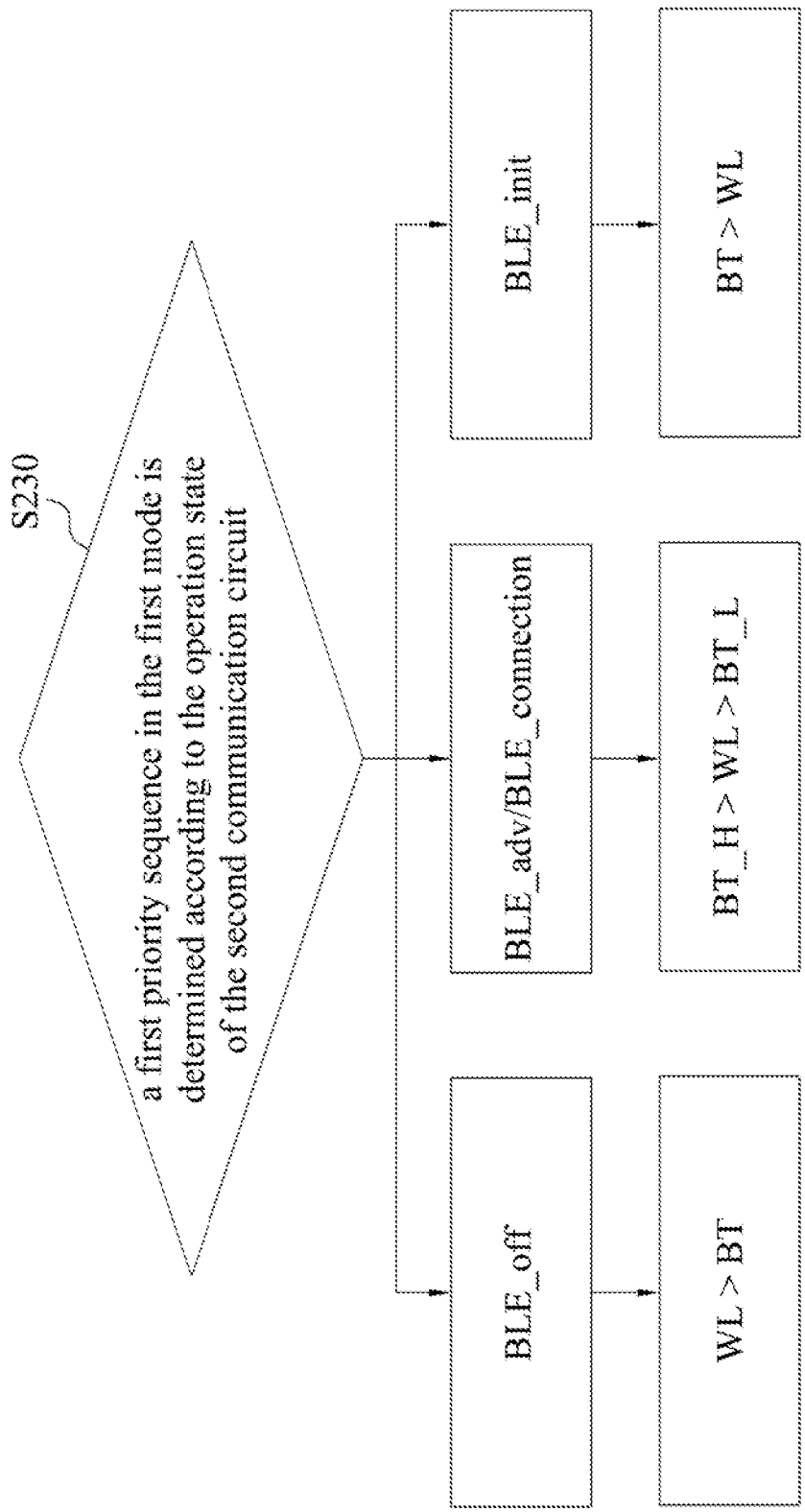
FIG. 4 is a flowchart of step S230 in FIG. 2 in accordance with one embodiment of the present disclosure.

In step S230, the first priority sequence of the first mode is determined according to the operation state of the second communication circuit. For the better understanding of the first priority sequence, reference is made to FIGS. 1, 2, 3A and 4. FIG. 4 is a flowchart of step S230 in FIG. 2 in accordance with one embodiment of the present disclosure.

As shown in FIG. 4, is the second communication circuit 120 is in an off state BLE_off, the first priority sequence from high to low priority is sequentially the first packets WL to the second packets BT.

If the second communication circuit 120 in an advertising state BLE_adv or a connection state BLE_connection, the first priority sequence from high to low priority is sequentially a part of the second packets BT with relatively high priority BT_H, the first packets WL to the other part of the second packets BT with relatively low priority BT_L.

If the second communication circuit 120 is in an initial state BLE_init, the first priority sequence from high to low priority is sequentially the second packets BT to the first packets WL.

In step S240, the communication system is determined to operate in the second mode. In step S250, the transmission and reception period of the antenna is divided into a first scheduling period and a second scheduling period. And, in step S260, the second priority sequence of the first scheduling period and the third priority sequence of the second scheduling period are determined according to an operation state of the first communication circuit.

Figure 5:
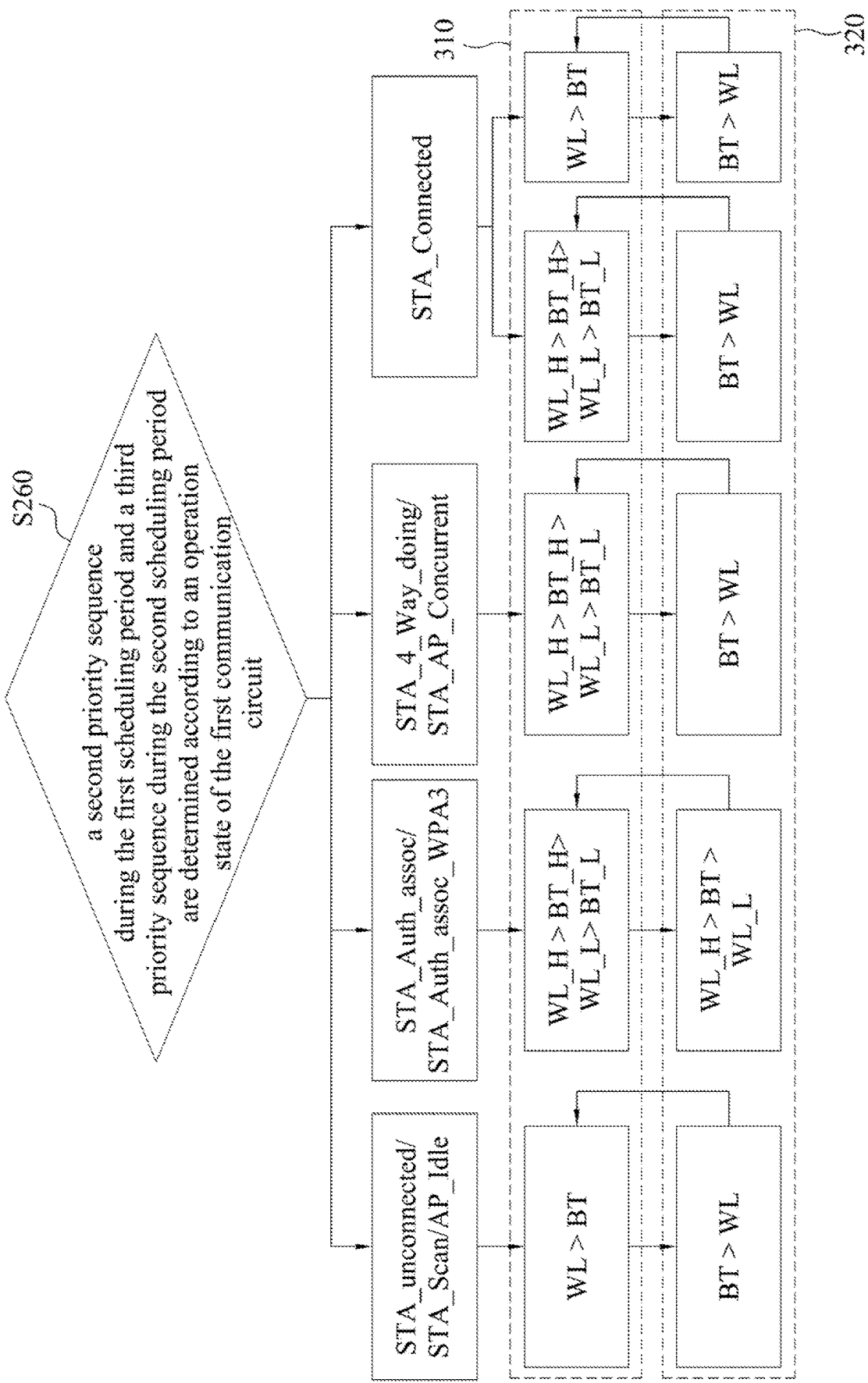
FIG. 5 is a flowchart of step S260 in FIG. 2 in accordance with one embodiment of the present disclosure.

For the better understanding of the second priority sequence and the third sequence, reference is made to FIGS. 1, 2, 3B and 5. FIG. 5 is a flowchart of step S260 in FIG. 2 in accordance with one embodiment of the present disclosure.

As shown in FIG. 5, if an operation status of the first communication circuit 110 is in a first mode, the second priority sequence in the first scheduling period 310 from high to low priority is sequentially the first packets WL to the second packets BT, and the third priority sequence in the second scheduling period 320 from high to low priority is sequentially the second packets BT to the first packets WL. In some embodiments, if the operation state of the first communication circuit 110 is in a first state, the first communication circuit 11 is operated as a station and is in unconnected state STA_Unconnected or scanning state STA_Scan. In other embodiments, if the operation state the first communication circuit 110 is in a first state, the first communication circuit 110 is operated as an access point and is in idle state AP_Idle.

If the operation state of the first communication circuit 110 is in a second state, the second priority sequence in the first scheduling period 310 from high to low priority is sequentially a part of the first packets with relatively high priority WL_H, a part of the second packets with relatively high priority BT_H, the other part of the first packets with relatively low priority WL_L and the other part of the second packets with relatively low priority BT_L; the third priority sequence in the second scheduling period 320 from high to low priority is sequentially a part of the first packets with relatively high priority WL_H, the second packets BT to the other part of the first packets with relatively low priority WL_L. In some embodiments, if the operation state of the first communication circuit 110 is in a second state, the first communication circuit 110 is operated as a station and is in an authentication and association state STA_Auth_assoc or a third generation authentication and association state STA_Auth_assoc_WPA3.

If the operation state of the first communication circuit 110 is in a third state, the second sequence in the first scheduling period 310 from high to low priority is sequentially a part of the first packets with relatively high priority WL_H, a part of the second packets with relatively high priority BT_H, the other part of the first packets with relatively low priority WL_L and the other part of the second packets with relatively low priority BT_L; and the third sequence in the second scheduling period 320 from high to low priority is sequentially the second packets BT to the first packets WL. In some embodiments, if the operation state of the first communication circuit 110 is in a third state, the first communication circuit 110 is operated as a station and in four-way handshake state STA_4_Way_doing. In other embodiments, if the operation state of the first communication circuit 110 is in a third state, the first communication circuit 110 is simultaneously operated as a station and an access point in a coexistence state STA_AP_Concurrent.

In some embodiments, when the operation state of the first communication circuit 110 is in a fourth state, the second sequence in the first scheduling period 310 from high to low priority is sequentially a part of the first packets with relatively high priority WL_H, a part of the second packets with relatively high priority BT_H, the other part of the first packets with relatively low priority WL_L and the other part of the second packets with relatively low priority BT_L; and the third sequence in the second scheduling period 320 from high to low priority is sequentially the second packets BT to the first packets WL. In other embodiments, when the operation state of the first communication circuit 110 is in a fourth state, the second sequence in the first scheduling period 310 from high to low priority is sequentially the first packets WL to the second packets BT; and the third sequence in the second scheduling period 320 from high to low priority is sequentially the second packets BT to the first packets WL. In some embodiments, if the operation state of the first communication circuit 110 is in a fourth state, the first communication circuit 110 is operated as a station and in a connection state STA_Connected.

In some embodiments, when the communication system 100 is operated in the second mode and the first communication circuit 110 is in an unconnected state STA_Unconnexted, four-way handshake state STA_4_Way_doing or an idle state AP_Idle, the allocation ratio of the first scheduling period 310 and the second scheduling period 320 can be 60:40. When the communication system 100 is operated in the second mode and the first communication circuit 110 is in a scanning state STA_Scan, if the scanning state STA_Scan is an active scan, the allocation ratio of the first scheduling period 310 and the second scheduling period 320 can be 50:50; and if the scanning state STA_Scan is a passive scan, the allocation ratio of the first scheduling period 310 and the second scheduling period 320 can be 40:60.

When the communication system 100 is operated in the second mode, and the first communication circuit 110 is in an authentication and the association state STA_Auth_assoc or the third generation authentication and the association state STA_Auth_assoc_WPA3, the allocation ratio of two sets of the interleaved the first scheduling period 310 and the second scheduling period 320 can be 37:13:37:13. In some embodiments, the aforesaid two sets of the interleaved the first scheduling period 310 and the second scheduling period 320 can be arranged in a time length of a beacon time interval of the access point.

When the communication system 100 is operated in a second mode and the first communication circuit 110 is in a coexistence state STA_AP_Concurrent, the allocation ratio the first scheduling period 310 and the second scheduling period 320 can be 80:20.

In some embodiments, when the communication system 100 is operated in the second mode, and the first communication circuit 110 is in a connection state STA_Connected, the allocation ratio the first scheduling period 310 and the second scheduling period 320 can be set according to the actual application.

T be noted that, if the communication system 100 is operated as a station in the second mode, the first communication circuit 110 and the second communication circuit 120 included in the communication system 100 can transmitted/received all packets through the retry mechanism. On the other hand, if the communication system 100 is operated as an access point in the second mode, the first communication circuit 110 included in the communication system 100 can control the packets corresponding the station STA by the control packet (such as, the control packet Qos-Null), and can cooperate with the retry mechanism to transmitted/received all packets.

As a result, in the second mode, the communication system 100 can ensure that the second communication circuit 120 has enough time to utilize the antenna 150 to transmit or receive the second packets, to complete the scan task.

Figure 6:
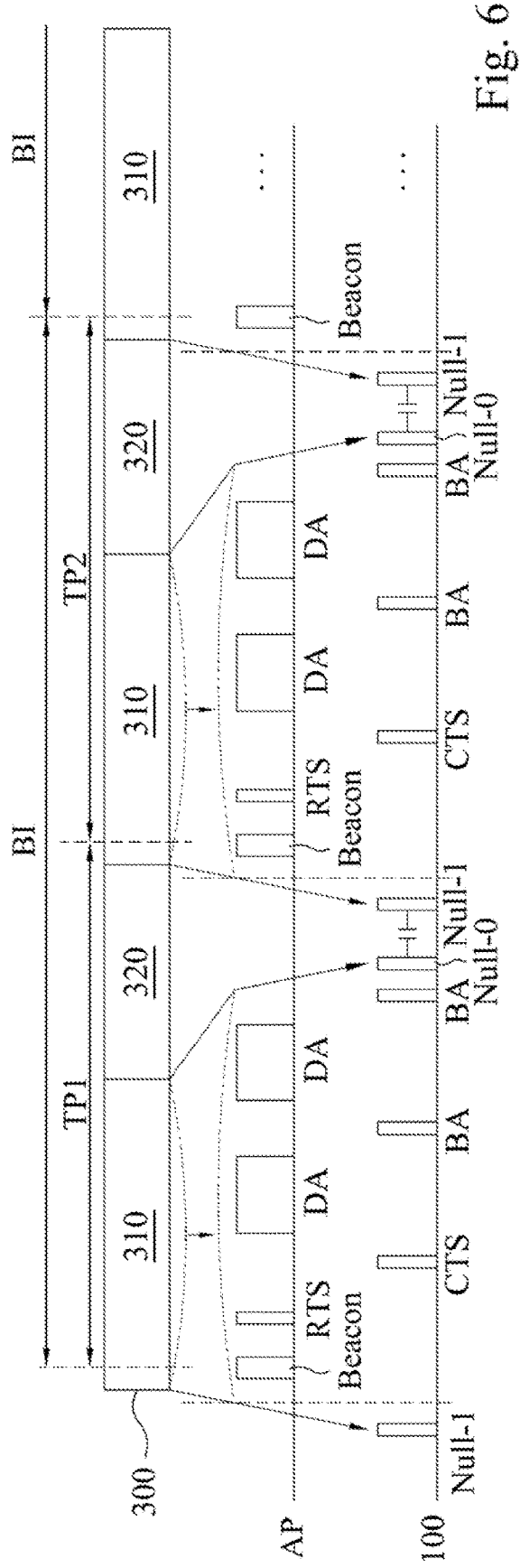
FIG. 6 is a schematic diagram of the communication system in FIG. 1 under a second mode in accordance with one embodiment of the present disclosure.

Reference is made to FIG. 6. FIG. 6 is a schematic diagram of the communication system 100 in FIG. 1 under a second mode in accordance with one embodiment of the present disclosure. The time period TP1 and TP2 allocated to the first scheduling period 310 and the second scheduling period 320 by the communication system 100 can be deployed by a beacon interval BI of the beacons Beacon transmitted by the accessing point AP.

In some embodiments, one beacon interval BI includes two sets of the first scheduling period 310 and the second scheduling period 320. In the other embodiments, one beacon interval BI includes one set of the first scheduling period 310 and the second scheduling period 320. Therefore, it is not intended to limit the present disclosure. In some embodiments, a time length of one beacon interval BI is 102 milliseconds. In other embodiments, a time length of one beacon interval BI is 10~500 milli-second. Therefore, it is not intended to limit the present disclosure.

As shown in FIG. 6, when the communication system 100 is operated as a station and is connected to the access point AP, when the first packets are transmitted or received, the communication system 100 determines the time to start the first scheduling period 310 according to the beacons Beacon in the beacon signal of the access point AP, and communication system 100 determines the time allocation ratio of the first scheduling period 310 and the second scheduling period 320 according to the operation state of the first scheduling period 310 and the second scheduling period 320, so as to determine the end of the first scheduling period 310 of the start of the second scheduling period 320.

As shown in FIG. 6, in the first scheduling period 310, when the first communication circuit 110 is permitted to utilize the antenna 150, the control circuit 130 controls the switch circuit 140 to select the electrical path of the nodes 1-2, such that the first communication circuit 110 can transmit/receive signals by utilizing the antenna 150 through the electrical path of the nodes 1-2. After the first communication circuit 110 receive the control packet RTS from the accessing point AP, the first communication circuit 110 transmits the control packet CTS to the accessing point AP, to inform the accessing point AP can perform the signal transmission. And, after the accessing point AP transmits the aggregation data packet DA, the first communication circuit 110 transmits the acknowledgement packet BA to inform the accessing point AP that the data has been received. Before the communication system 100 is going to end the first scheduling period 310 and to enter the second scheduling period 320, the first communication circuit 110 transmit the control packet Null-0 to inform that the access point AP to suspend transmitting the first packets. At the end of the second scheduling period 320, the first communication circuit 110 transmits the control packet Null-1 to inform the access point AP can continue to transmit the first packets.

Figure 7:
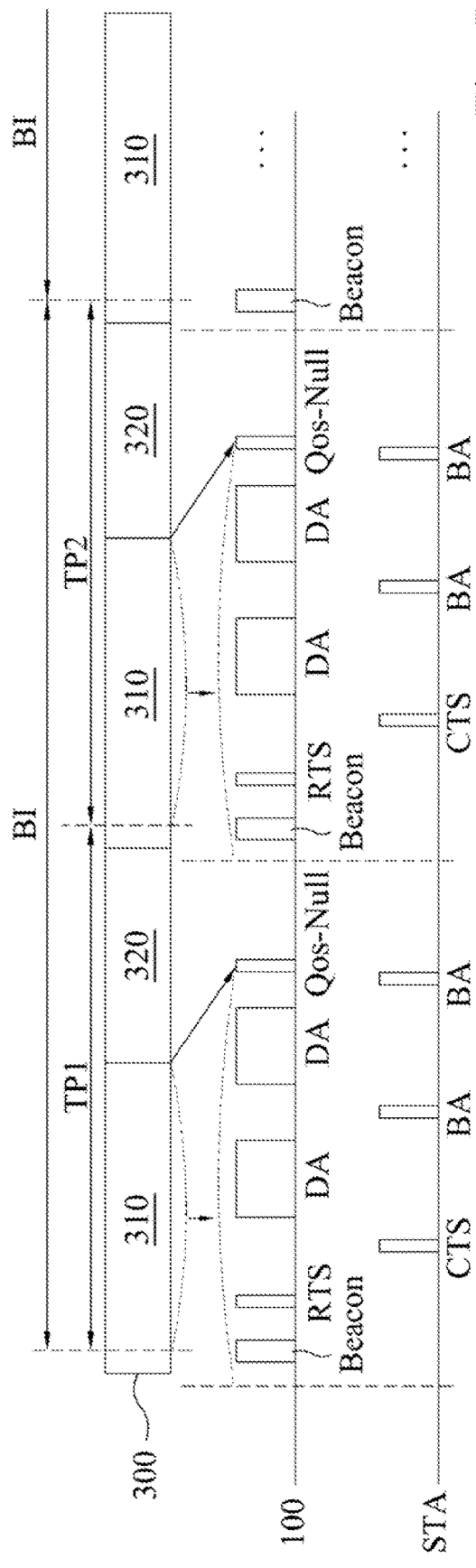
FIG. 7 is a schematic diagram of the communication system in FIG. 1 under a second mode in accordance with one embodiment of the present disclosure.

Reference is made to FIG. 7. FIG. 7 is a schematic diagram of the communication system 100 in FIG. 1 under a second mode in accordance with one embodiment of the present disclosure.

As shown in FIG. 7, when the communication system 100 is operated as the access point AP and is connected to the station STA to transmit and receive the first packets, the communication system 100 can transmit the control packet Qos-Null to inform the station STA to suspend transmitting the first packets before the end of the first scheduling period 310, so as to start the second scheduling period 320.

Figure 8:
FIG. 8 is a schematic diagram of signal transmission between a central device and peripheral devices in accordance with one embodiment of the present disclosure.

Reference is made to FIG. 8. FIG. 8 is a schematic diagram of signal transmission 400 between a central device 410 and peripheral devices 412 and 414 in accordance with one embodiment of the present disclosure. In some embodiments as shown in FIG. 8, the central device 410 can be implemented by the communication system 100. And, the structure and the operation manner can be considered as the communication system 100. As shown in FIG. 8, the transmission and reception period included in one time period TP of the central device 410 is divided into the first scheduling period 310 and the second scheduling period 320. The first scheduling period 310 in FIG. 8 is similar to the first scheduling period 310 in FIGS. 6 and 7, and therefore the description is omitted here.

In some embodiments, the BLUETOOTH™ communication circuit of the central device 410 supports the specification after BLUETOOTH™ 4.0 (such as, BLUETOOTH™ 5.0). After the BLUETOOTH™ 4.0, the BLUETOOTH™ communication circuit may include multiple state machines, and each state machine performs the different task. As shown in FIG. 8, when the BLUETOOTH™ communication circuit of the central device 410 is in the scanning state during the second scheduling period 320, the BLUETOOTH™ communication circuit scans the advertising packet 424 transmitted from the peripheral device 414 in the corresponding time interval 321, the BLUETOOTH™ communication circuit of the central device 410 can perform the data transmission 422 (connection event 422) with the connected peripheral device 412 in the second scheduling period 320 (such as, the time interval 322). Furthermore, the BLUETOOTH™ communication circuit of the central device 410 can transmits the advertising packet 426 in the second scheduling period 320 (such as, the time interval 323).

On the other hand, during the first scheduling period 310, if the transmission of the high priority packets of the WiFi communication circuit of the central device 410 has not complete yet, the BLUETOOTH™ communication circuit of the central device 410 cannot receive the advertising packet 420 from the peripheral device 414, the BLUETOOTH™ communication circuit of the central device 410 cannot perform the data transmission 422 with the peripheral device 412, or transmits the advertising packet 426.

Summary, the communication system 100 of the present disclosure determines the permission for utilizing the single antenna 150 according to the operation state of the first communication circuit 110 and the second communication circuit 120, such that the first communication circuit 110 and the second communication circuit 120 can share the antenna 150 and can complete their jobs in the appropriate timing. As a result, under the condition that the second communication circuit 120 of the communication system 100 includes the scanning state, the transmission and reception period 300 of the communication system 100 is divided into the first scheduling period 310 and the second scheduling period 320, in order to increase the efficiency for the second communication circuit 120 to complete the scanning task.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A communication system, comprising:
   an antenna;
   a first wireless communication circuit, configured to transmit or receive a plurality of first packets through a first path;
   a second wireless communication circuit, configured to transmit or receive a plurality of second packets through a second path;
   a switch circuit, configured to select the first path and or second path to connect the antenna to the first wireless communication circuit or the second wireless communication circuit; and
   a control circuit, configured to:
      control the switch circuit to select the first path or the second path according to a first priority sequence in a first mode;
      divide a transmission and reception period of the antenna into a plurality of first scheduling periods and a plurality of second scheduling periods interleaved with the first scheduling periods in a second mode, wherein the control circuit controls the switch circuit, according to a second priority sequence during the first scheduling periods and according to a third priority sequence during the second scheduling periods, to select the first path or the second path in the second mode, wherein the second priority sequence is different from the third priority sequence, wherein in the second mode, the control circuit is further configured to:
   control the switch circuit to connect the antenna to the first wireless communication circuit or the second wireless communication circuit according to the second priority sequence during the first scheduling periods; and
   control the switch circuit to connect the antenna to the first wireless communication circuit or the second wireless communication circuit according to the third priority sequence during the second scheduling periods, wherein the second priority sequence and the third priority sequence is determined by an operation state of the first wireless communication circuit, wherein the control circuit determines allocation ratio of the first scheduling periods and the second scheduling periods according to the operation state of the first wireless communication circuit, and wherein in the second mode:
      if the operation state of the first wireless communication circuit is at a first state, the second priority sequence from high to low priority is sequentially the first packets and the second packets, and the third priority sequence from high to low priority is sequentially the second packets and the first packets;
      if the operation state of the first wireless communication circuit is at a second state, the second priority sequence from high to low priority is sequentially a part of the first packets with relatively high priority, a part of the second packets with relatively high priority, the other part of the first packets with relatively low priority and the other part of the second packets with relatively low priority, and the third priority sequence from high to low priority is the part of the first packets with relatively high priority, the second packets and the other part of the first packets with relatively low priority;
      if the operation state of the first wireless communication circuit is at a third state, the second priority sequence from high to low priority is sequentially a part of the first packets with relatively high priority, a part of the second packets with relatively high priority, the other part of the first packets with relatively low priority and the other part of the second packets with relatively low priority, and the third priority sequence from high to low priority is sequentially the second packets and the first packets; or
      if the operation state of the first wireless communication circuit is at a fourth state, the second priority sequence from high to low priority is sequentially a part of the first packets with relatively high priority, a part of the second packets with relatively high priority, the other part of the first packets with relatively low priority and the other part of the second packets with relatively low priority, and the third priority sequence from high to low priority is sequentially the second packets and the first packets.

2. The communication system of claim 1, wherein:
   during the first scheduling periods and the second scheduling periods, the first wireless communication circuit and the second wireless communication circuit transmit or receive the first packets and the second packets according to the second priority sequence and the third priority sequence.

3. The communication system of claim 1, wherein,
   the control circuit determines to operate the communication system in the first mode or the second mode according to an operation state of the second wireless communication circuit;
   if the operation state of the second wireless communication circuit comprises a scanning state, the control circuit determines to operate the communication system in the second mode; and
   if the operation state of the second wireless communication circuit does not comprise the scanning state, the control circuit determines to operate the communication system in the first mode.

4. The communication system of claim 1, wherein the first wireless communication circuit is a wireless local area network communication circuit, wherein the second wireless communication circuit is a BLUETOOTH™ communication circuit, wherein the BLUETOOTH™ communication circuit comprises BLUETOOTH™ low energy techniques.

5. A communication method for operating a communication system, wherein the communication system comprises an antenna, a first wireless communication circuit and a second wireless communication circuit, wherein the antenna respectively connects the first wireless communication circuit and the second wireless communication circuit through a first path and a second path, wherein the communication method comprises:
   determining to operate the communication system in a first mode or a second mode according to an operation state of the second wireless communication circuit;
   in the first mode, controlling a switch circuit to select the first path or the second path according to a first priority sequence;
   in the second mode, dividing a transmission and reception period of the antenna into a plurality of first scheduling periods and a plurality of second scheduling periods interleaved with the first scheduling periods, and controlling the switch circuit to select the first path or the second path, according to a second priority sequence during the first scheduling periods and according to a third priority sequence during the second scheduling periods, to connect the antenna to the first wireless communication circuit or the second wireless communication circuit, wherein the second priority sequence is different from the third priority sequence, wherein the communication method further comprises:

in the second mode, controlling the switch circuit to connect the antenna to the first wireless communication circuit or the second wireless communication circuit according to the second priority sequence during the first scheduling periods; and in the second mode, controlling the switch circuit to connect the antenna to the first wireless communication circuit or the second wireless communication circuit according to the third priority sequence during the second scheduling periods, wherein the second priority sequence and the third priority sequence is determined by the operation state of the first wireless communication circuit, wherein an allocation ratio of the first scheduling periods and the second scheduling periods is determined according to the operation state of the first wireless communication circuit, and wherein in the second mode:

if the operation state of the first wireless communication circuit is at a first state, the second priority sequence from high to low priority is sequentially the first packets and the second packets, and the third priority sequence from high to low priority is sequentially the second packets and the first packets;

if the operation state of the first wireless communication circuit is at a second state, the second priority sequence from high to low priority is sequentially a part of the first packets with relatively high priority, a part of the second packets with relatively high priority, the other part of the first packets with relatively low priority and the other part of the second packets with relatively low priority, and the third priority sequence from high to low priority is the part of the first packets with relatively high priority, the second packets and the other part of the first packets with relatively low priority;

if the operation state of the first wireless communication circuit is at a third state, the second priority sequence from high to low priority is sequentially a part of the first packets with relatively high priority, a part of the second packets with relatively high priority, the other part of the first packets with relatively low priority and the other part of the second packets with relatively low priority, and the third priority sequence from high to low priority is sequentially the second packets and the first packets; or if the operation state of the first wireless communication circuit is at a fourth state, the second priority sequence from high to low priority is sequentially a part of the first packets with relatively high priority, a part of the second packets with relatively high priority, the other part of the first packets with relatively low priority and the other part of the second packets with relatively low priority, and the third priority sequence from high to low priority is sequentially the second packets and the first packets.

6. The communication method of claim 5, further comprising:

during the first scheduling periods and the second scheduling periods, connecting one of the first wireless communication circuit and the second wireless communication circuit to the antenna to transmit or receive a plurality of first packets or a plurality of second packets, according to the second priority sequence and the third priority sequence.

7. The communication method of claim 6, further comprising:

determining to operate the communication system in the first mode or the second mode according to the operation state of the second wireless communication circuit;

if the operation state of the second wireless communication circuit comprises a scanning state, determining to operate the communication system in the second mode; and if the operation state of the second wireless communication circuit does not comprise the scanning state, determining to operate the communication system in the first mode.

8. The communication method of claim 5, wherein the first wireless communication circuit is a wireless local area network communication circuit, wherein the second wireless communication circuit is a BLUETOOTH™ communication circuit, wherein the BLUETOOTH™ communication circuit comprises BLUETOOTH™ low energy techniques.

* * * * *